Nov. 8, 1927.
E. AICHELE
COMPOSITION OF MATTER
Filed April 17, 1925
1,648,100
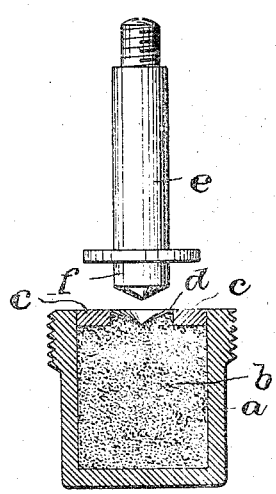
INVENTOR:
Ernest Aichele,
BY
Frantzef and Richards
ATTORNEYS.

Patented Nov. 8, 1927.

1,648,100

UNITED STATES PATENT OFFICE.

ERNEST AICHELE, OF IRVINGTON, NEW JERSEY.

COMPOSITION OF MATTER.

Application filed April 17, 1925. Serial No. 23,832.

This invention relates, generally, to a novel composition of matter; and, the present invention has reference, more particularly, to a composition of metals to produce a novel element for use in making electrical contact-establishing elements.

The invention relates, furthermore, to a novel method or process of producing a composition of metals to produce a novel element for use in making electrical contact-establishing elements.

The present invention, therefore, has for its principal objects:—

Firstly:—To produce a novel composition of matter for the purposes hereinafter more fully set forth;

Secondly:—To provide a composition of metals which will produce an element for use in the electrical arts, especially in the form of electrical contact-establishing elements;

Thirdly:—To produce an electrical contact-establishing element or composition of metals of semi-plastic form, which always retain such semi-plastic form, irrespective of any heat that may be produced, which will be a good conductor of electricity, which may be used for electrical contacts that will not fuse or stick, when subjected to extreme heat from the current of electricity passing therethrough, and which owing to its nature will not "pit" so as to produce imperfect electrical contact between two parts.

Fourthly:—To provide a novel method or process of producing a composition of matter for making electrical contact-establishing elements of the character and for the purposes stated.

Other objects of the present invention not at this time more particularly enumerated will be clearly understood from the following detailed description of the present invention.

With the various objects of the present invention in view, the said invention consists, primarily, in the novel composition of matter or metals for the production more especially of electrical contact-establishing elements, which will not fuse or stick, and which will not burn or pit, during make and break contacts; and, the invention consists, furthermore, in the novel method or process of producing a composition of matter or metals of the character and for the purposes hereinafter more fully set forth.

This composition of matter or metal, as well as the process of producing the same, while especially adapted for use in the electrical art, can be used in numerous ways in other arts, but it is especially superior for its use in the manufacture of electrical contact-establishing elements, where the most perfect electrical contact is desired.

In carrying out my invention, I provide for a mixture of mercury, lead, and copper or brass in powder form, which is treated to a bath of acid. The lead is then heated to its melting point, and the acid treated copper or brass, and the mercury being added to the fluid lead, and stirred, so as to produce a cohesive mass having a semi-plastic or paste-like consistency, which consistency it retains at all times and under all conditions.

As an illustration, I have demonstrated that a good and perfect conductor of electricity for contact-establishing elements is produced by making a mixture of the following metals in the proportions mentioned, namely:—Lead ⅓ pound; copper or brass in powder-form, ⅓ pound; and mercury, ⅓ pound.

In carrying out the method or process of producing my novel composition of matter or metals, I first treat the quantity of copper or brass with an acid, to cleanse the same from fatty or oxidizing substances, as sulphuric acid, then I take a desired quantity of lead and heat the same to its melting point, so as to produce a fluid mass. To this fluid mass of lead I add the acid treated copper or brass, and produce a perfect mixture by stirring or agitation.

The purpose of adding an acid is to remove from the copper or brass any usual fatty substances generally adhering thereto, by its combining with the acid and passing off by volatilization, whereby a perfect and intimate mixture of the copper or brass powder with the molten lead is produced. To this mixture of lead and copper or brass, while still liquid but while cooling, I next add a desired quantity of mercury, constantly stirring or agitating the mass until a perfect mixture is obtained. The liquid mass is then poured into a form of any shape desired, the result being a semi-plastic or paste-like mass, which semi-plastic consistency the mass retains at all times and under all conditions.

In the accompanying drawing, in which the figure shows a pair of contacts, one of which comprises a receptacle, shown in section, and being adapted to hold my novel composition of matter or metals to serve as an electrical contact-establishing element.

In said drawing, $a$ indicates a metal contact-member in the form of a receptacle into which is packed the semi-plastic mass $b$, consisting of the composition of metals hereinabove mentioned. The upper part of the receptacle $a$ is closed by means of a plate or disc $c$, in which there is a hole or perforation, as $d$, for entrance therein and for electric contact with the mass $b$ of the contact-making end $f$ of a contact-post or member, as $e$.

Thus, when the part $f$ of the member $e$ enters into contact with the semi-plastic mass, $b$, the two members $a$ and $e$ it being understood being in an electric circuit, a perfect electrical contact will be established, and no matter how much heat may be produced the condition of the mass $b$ remains the same. With the withdrawal of the member $e$, electric contact is broken, with some of the mass $b$ adhering to the end $f$ of the member, no burning or pitting due to sparking taking place, and permitting a perfect electric contact to be made, when the parts are again brought together.

Of course, I am fully aware that in the production of my novel composition of matter or metals, the various proportions of the ingredients as hereinabove given may be changed without departing from the scope of the present invention. Hence, I do not limit my present invention to the exact combinations of the ingredients of the composition of matter or metals as described in the said specification, nor do I confine myself to the exact proportions of the ingredients constituting the composition of matter or metals, as given in the said specification.

I claim:—

1. The method herein described, which consists in heating lead to its melting point, stirring acid-cleaned powdered copper into the molten lead, stirring mercury into the mixture produced, and finally cooling the entire mixture to produce a semi-plastic mass.

2. A semi-plastic non-fusible metallic composition suitable for an electrical contact function, comprising a mixture in substantially equal proportions by weight of a low-melting point metal, powdered copper and murcury.

3. A semi-plastic non-fusible metallic composition suitable for an electrical contact function, comprising a mixture, in the herein specified proportions by weight, of one part lead, one part copper powder, and one part mercury.

4. A semi-plastic non-fusible metallic composition suitable for an electrical contact function, comprising a mixture, in the herein specified proportions by weight, of one part lead, one part acid-cleaned copper powder, and one part mercury.

In testimony, that I claim the invention set forth above I have hereunto set my hand.

ERNEST AICHELE.